United States Patent
Mazuk et al.

(10) Patent No.: US 8,743,020 B1
(45) Date of Patent: Jun. 3, 2014

(54) AVIONICS DISPLAY ARCHITECTURE WITH INDEPENDENT PROCESSING AND MONITORING CHANNELS

(75) Inventors: Daniel E. Mazuk, Marion, IA (US); Eric N. Anderson, Cedar Rapids, IA (US); Rachel D. Sparks, Cedar Rapids, IA (US); Sara A. Murphy, Cedar Rapids, IA (US); Clifford R. Klein, Marion, IA (US); Keith A. Stover, Lisbon, IA (US); Matthew P. Corbett, Mount Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 139 days.

(21) Appl. No.: 13/559,213

(22) Filed: Jul. 26, 2012

(51) Int. Cl.
*G09G 5/00* (2006.01)
*G06T 1/00* (2006.01)
*G06F 15/00* (2006.01)

(52) U.S. Cl.
USPC .......................................... 345/1.1; 345/501

(58) Field of Classification Search
USPC .............. 345/1.1, 501, 503; 714/100, 1, 2, 11
See application file for complete search history.

(56) References Cited

U.S. PATENT DOCUMENTS

| | | | | |
|---|---|---|---|---|
| 7,987,385 | B2 * | 7/2011 | Pruiett et al. | 714/11 |
| 8,010,846 | B1 * | 8/2011 | Birkedahl et al. | 714/38.1 |
| 2011/0235527 | A1 * | 9/2011 | Buse et al. | 370/242 |

* cited by examiner

*Primary Examiner* — Jacinta M Crawford
(74) *Attorney, Agent, or Firm* — Donna P. Suchy; Daniel M. Barbieri

(57) ABSTRACT

A high integrity, high availability avionics display architecture for an avionics display system. The architecture includes a plurality of display processing computers (DPC) and a plurality of display integrity feedback interfaces. Each DPC includes at least two independent processing channels. Each independent processing channel includes at least two independent lanes. Each independent lane includes an I/O section and a processor section. Furthermore, each independent processing channel comprises an operative graphics section. At least one of the independent lanes provides a critical display function that provides commands to the graphics section to drive a display signal to displays of the avionics system. A number of display integrity feedback interfaces from the displays of the avionics display system provide integrity by allowing the integrity monitor functions to detect faults within the display signals and/or originating from the displays.

18 Claims, 5 Drawing Sheets

US 8,743,020 B1

AVIONICS DISPLAY ARCHITECTURE WITH INDEPENDENT PROCESSING AND MONITORING CHANNELS

BACKGROUND OF THE INVENTION

1. Field of the Invention

The present invention relates generally to avionics systems and more particularly to a high integrity, high availability avionics display architecture for an avionics display system.

2. Description of the Related Art

Modern onboard avionics networks serve to provide data transfer between various components of an aircraft. Avionics systems typically have a variety of systems that provide data to processing components of the aircraft or exchange data among one or more components of the aircraft. For example, a variety of avionics modules may gather avionics data (e.g., sensors detecting speed, direction, external temperature, control surface positions, and the like) that is routed by the avionics system via an avionics network to one or more aircraft components such as displays, monitoring circuits, processors, and the like.

In some aircraft systems, the avionics network may be constructed with an Aeronautical Radio Inc. (ARINC) 429 data bus capable of supporting communication between many components. More recently, Ethernet networks have been used in avionic network environments by leveraging Commercial Off The Shelf (COTS) technology to increase bandwidth and reduce cost.

Ethernet type networks have been used in communication networks for implementing communication among various network components. An Ethernet network may be used to send or route data in a digital form by packets or frames. Each packet contains a set of data, and the packet is generally not interpreted while sent through the Ethernet network. In an avionics network environment, the Ethernet network typically has different components that subscribe to the avionics network and connect to each other through switches. Each network subscriber can send packets in digital form, at controlled rates, to one or more other subscribers. When a switch receives the packets, the switch determines the destination equipment and directs or switches the packets to such equipment.

Such Ethernet networks may include ARINC-664 based networks. In a switched full-duplex Ethernet type network, the term "full-duplex" refers to sending and receiving packets at the same time on the same link, and the term "switched" refers to the packets being switched in switches on appropriate outputs. However, the ARINC-664 network uses multiple switches and redundant paths to route data, point-to-point or point-to-multipoint across the switches. Typically, remote data concentrators are connected using a wired ARINC-664 network.

FIG. 1 (Prior Art) is a schematic illustration of the avionics display architecture for an avionics display system presently utilized in a Boeing 787 aircraft. As can be seen in this Figure the Boeing 787 architecture includes a Integrated Module Architecture (IMA) system, also referred to as a Common Core System (CCS) that includes a right processing cabinet of the IMA system, also referred to as a right common computing resource (CCR), a left CCR, an ARINC-664 Network, and Remote Data Concentrators (RDCs). Each CCR includes Graphics Generation Modules (GGMs) and General Processing Modules (GPMs). The Display and Crew Alerting (DCA) system includes the software applications within the CCS and the displays of the display system. (Thus, the DCA system includes the GPMs and the GGMs.) There are five heads down displays (HDD) and two heads up displays (HUD). The RDCs are operatively connected to a variety of aircraft sensors and other systems.

The Boeing 787 Display and Crew Alerting System within the Common Core System (CCS) architecture is over 10 years old. The DCA system consumes five of the sixteen GPMs of the CCS. Four GGMs (double width application specific modules) are based on the older graphics generation hardware. This current system has limited growth capacity and is based on late 1990's technology which requires more space and power than more modern electronics.

SUMMARY OF THE INVENTION

In a broad aspect, the present invention is embodied as a high integrity, high availability avionics display architecture for an avionics display system. The architecture includes a plurality of display processing computers (DPC) and a plurality of display integrity feedback interfaces. Each DPC includes at least two independent processing channels. Each independent processing channel includes at least two independent lanes. Each independent lane includes an I/O section and a processor section. Furthermore, each independent processing channel comprises an operative graphics section. At least one of the independent lanes provides a critical display function that provides commands to the graphics section to drive a display signal to displays of the avionics system. A number of display integrity feedback interfaces from the displays of the avionics display system provide integrity by allowing the integrity monitor functions to detect faults within the display signals and/or originating from the displays. Using an independent integrity monitoring application as a partition in a dual independent (as opposed to lockstep) processor displays solution enables improved allocation of system resources within a fielded cabinet avionics system.

This integrity monitoring solution uses independent CPUs and independent paths through shared processing elements (COTS and Custom) to generate both the displayed graphics data and a unique validation of the displayed solution (maintaining integrity and operational commonality with the current system).

In a preferred embodiment, a CDL I/O section receives critical data input from an avionics system of an aircraft. The CDL I/O section processes the critical data input and provides CDL I/O section output. An I/O application of the CDL processor section receives the CDL I/O section output and validates the critical data to provide validated critical data from the I/O application of the CDL processor section. A critical display application of the CDL processor section receives the validated critical data from the I/O application of the CDL processor section and processes the graphical representation of the critical data providing processed output. A CDL graphics engine receives the processed output from the critical display application of the CDL processor section and provides a rendering signal to a display of the avionics display system and an integrity monitor signal. An IML I/O section receives the critical data input from the avionics system of an aircraft, the CDL I/O section output, and a feedback signal from the display of the avionics display system. The IML I/O section processes the critical data input, the CDL I/O section output, and the feedback signal from the display, and provides IML I/O section output. An I/O application of the IML processor section receives the IML I/O section output and an integrity output from the I/O application of the CDL processor section and processes the same to provide validated integrity data from the I/O application of the IML processor section. An integrity application of the IML processor section receives the validated integrity data from the I/O application of the IML processor section, integrity output from the critical display application of the CDL processor section, and the integrity monitoring output rendering signal from the CDL graphics engine and provides a reset signal. A common DPC reset mechanism receives the reset signal from the integrity application of the IML processor section. The cooperation of the independent CDL and IML lanes provides an integrity display processing capability that assures critical data integrity.

The present invention is particularly advantageous in avionics applications because it frees up cabinet resources by removing the Display and Crew Alerting functionality and the associated processing and graphics hardware from the cabinets. This offloads five CCS General Purpose Modules. Removing GGMs frees up 12 "slots" in the 787 CCS and has similar benefits with other IMA systems. In accordance with this invention, the display processing applications are removed from the cabinets and hosted on the new display hardware, i.e. DPC, with the same integrity and availability as the current approach.

The new DPC hardware can tie into the network ARINC 664 switches. Based on this new display architecture the RDC/Network latency issues will be eliminated with a direct connection to the DPCs for the cursor control device (CCD), etc.

The present invention simplifies use of touch displays and integrated HUDs. It leverages the features of modern components to minimize the size, weight, power and cost impacts from adding DPCs. This architecture makes it easy to add video support (Synthetic Vision Systems/Enhanced Vision Systems) with no IMA changes.

This approach is applicable to providing a high integrity display solution to any cabinet based avionics system and provides a simple interface between the cabinet applications and the displays with minimal disruption to the current avionics fit. For the Boeing 777, the interface between the IMA cabinets and the displays processing could be derived from the existing communications network or via an ARINC 664 network, replacing the current graphics generators (i.e. thus a minimal impact to current 777 avionics).

This integrity monitoring approach minimizes the hardware support required to provide high integrity ($10^{-9}$) and availability. It minimizes the device development effort (e.g., no dual/triple lockstep ASIC, no triplex dice roll/voting) and removes hardware elements (i.e. cost) from the final solution while meeting/exceeding the integrity/availability of currently fielded avionics systems.

With the present invention, the display system can now have more flexibility and will be easily upgraded in the future without modifying the IMA configuration. The display system function is self-contained for easy, integration, etc. This architecture is extremely robust, flexible, and scalable to satisfy all future aircraft display needs for the foreseeable future.

Other objects, advantages, and novel features will become apparent from the following detailed description of the invention when considered in conjunction with the accompanying drawings.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
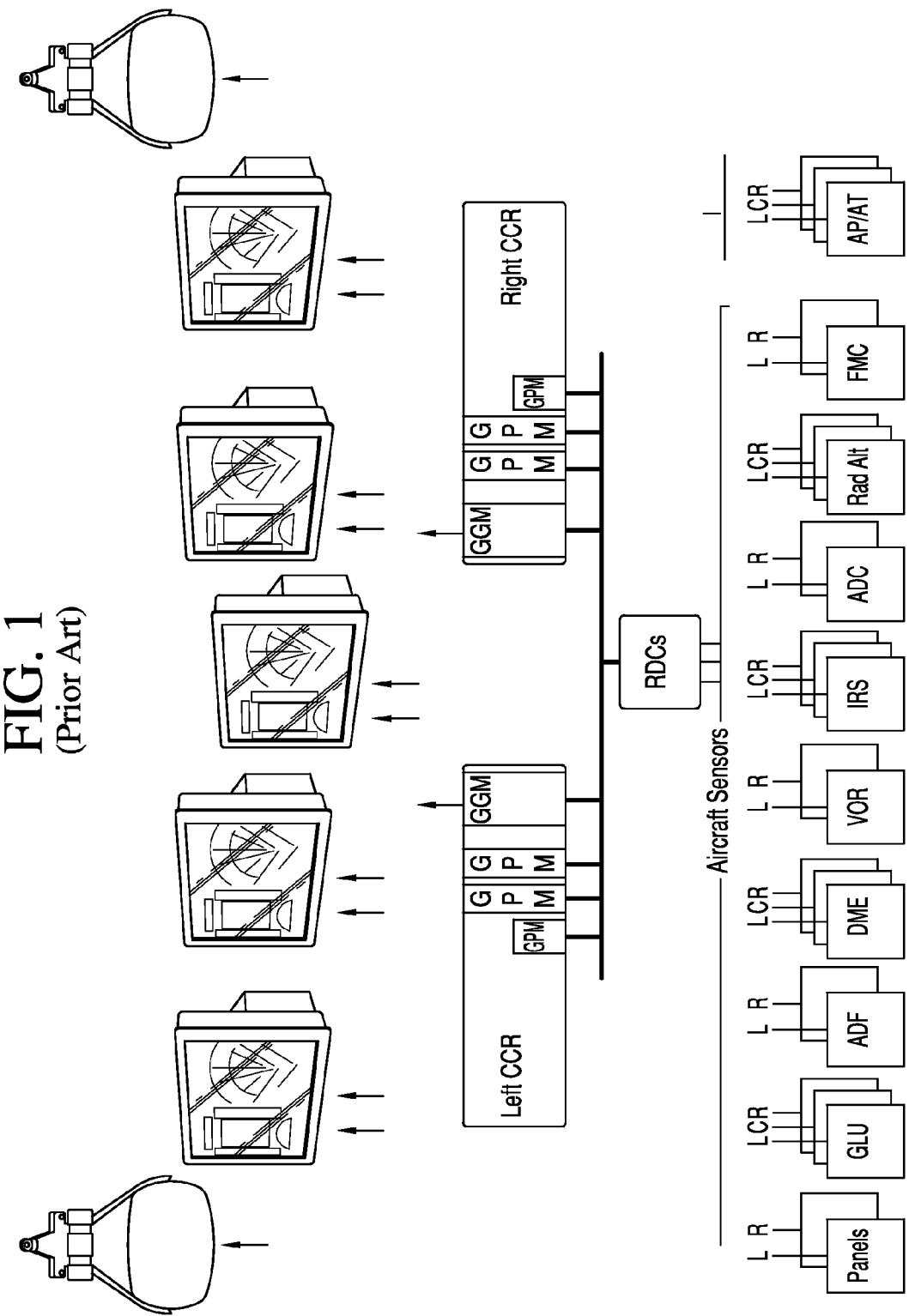
FIG. 1 (Prior Art) is a schematic illustration of the avionics display architecture for an avionics display system presently utilized in a Boeing 787 aircraft.
Figure 2:
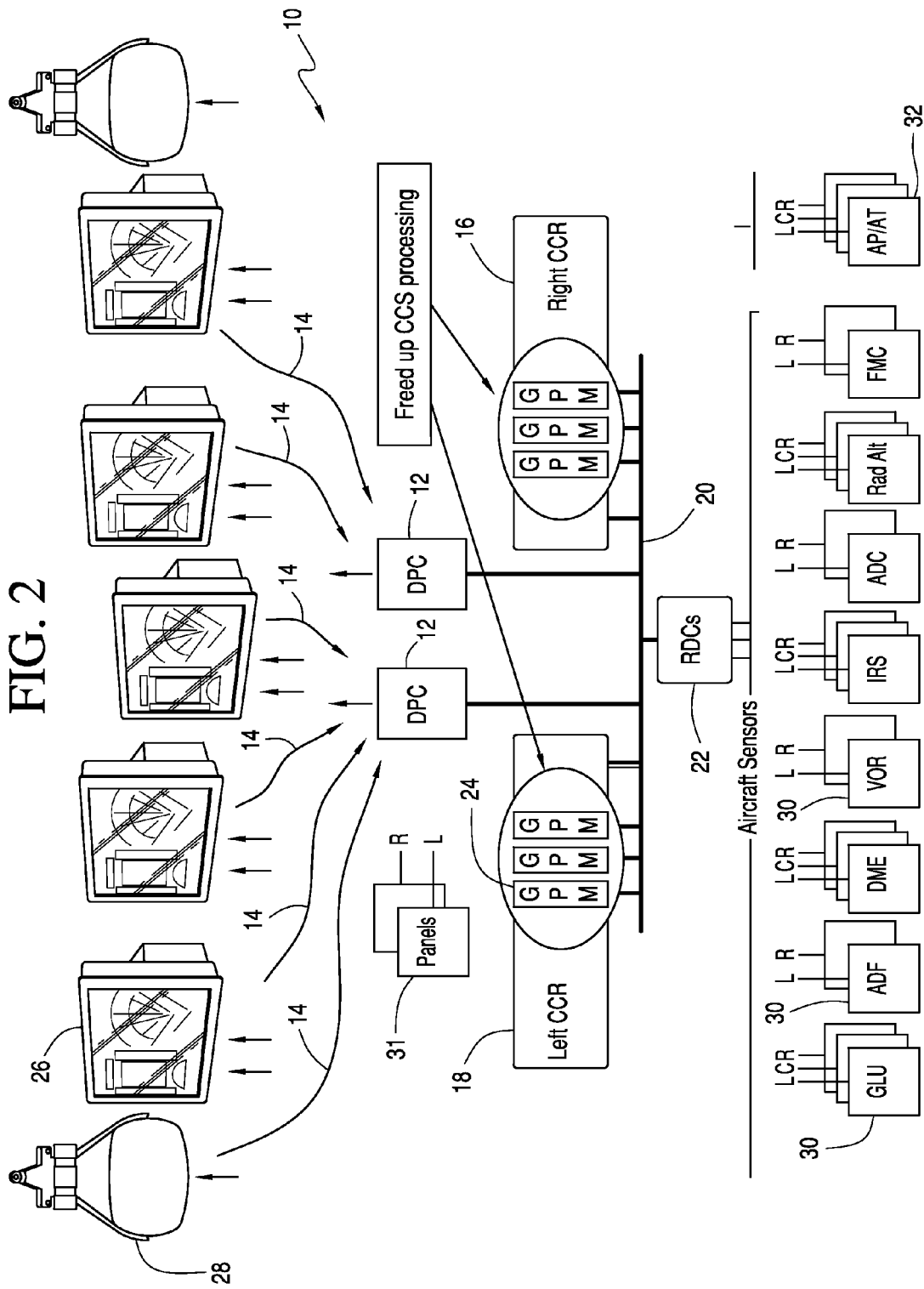
FIG. 2 is a schematic illustration of avionics display architecture for an avionics display system in accordance with the principles of the present invention.

Referring now to the drawings and the characters of reference marked thereon, FIG. 2 illustrates a preferred embodiment of the high integrity, high availability avionics display architecture for an avionics display system, in accordance with the principles of the present invention, this display architecture being designated generally as 10. The display architecture 10 includes a pair of display processing computers (DPCs) 12 with independent processing channels and a display integrity feedback interface 14, as will be disclosed below in detail.

This FIG. 2 embodiment includes a right processing cabinet of the IMA system, also referred to as a right common computing resource (CCR) 16, a left CCR 18, an ARINC-664 Network 20, and Remote Data Concentrators (RDCs) 22. Each CCR includes General Processing Modules (GPMs) 24. The Graphics Generation Modules (GGMs) are no longer in the CCS system. They are no longer needed. Thus, CCS processing is freed up. Since the software applications are removed from the GPMs the GPMs are free to execute other functions. This display architecture hosts the Display and Crew Alerting (DCA) software applications and the graphics generation hardware that was in the GGMs and combines it into two high integrity, high availability DPCs. There are five heads down displays (HDD) 26 and two heads up displays (HUD) 28. (Although seven displays are shown in this system, this display system architecture can accommodate an additional display.) The RDCs 22 are operatively connected to a variety of aircraft equipment and sensors 30 such as GLU—GPS Landing Unit, ADF—Automatic Direction Finder, DME—Distance Measuring Equipment, VOR—Very High Frequency Omni-directional Radio, IRS—Inertial Reference System, ADC—Air Data Computer, Rad Alt-Radio Altimeter, FMC—Flight Management Computer, AP/AT—Autopilot/Autothrottle (32). The flight deck panels 31 can be connected directly to the DPCs as shown in this Figure. This reduces the pilot interface latency.

Although this invention is being particularly described with respect to a Boeing 787 avionics architecture it can be implemented in other aircraft avionics systems, space systems, helicopters, and advanced ground vehicles.

Figure 3:
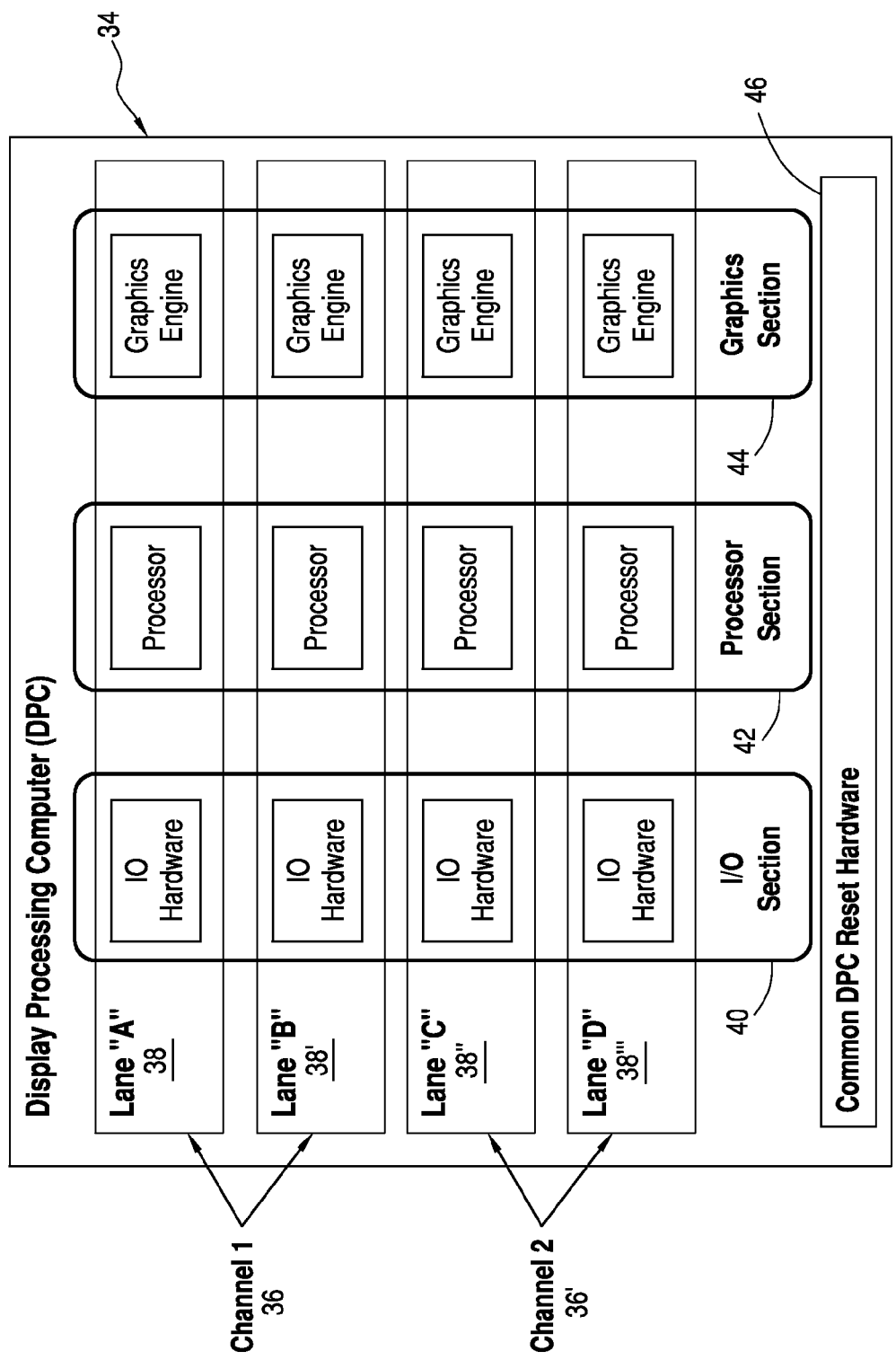
FIG. 3 is a schematic illustration of a display processing computer (DPC) of the present invention.

Referring now to FIG. 3, a DPC is illustrated, designated generally as 34. The DPC 34 includes at least two independent processing channels 36, 36'. Each independent processing channel includes at least two independent lanes 38, 38'. The term "processing channel" is well known by those skilled in this field and broadly refers to a processing entity with processing outputs directly applicable to the system. The term "lane" is also well known by those skilled in this field and refers to a processing output that may require monitoring. Both processing channels and lanes include an I/O hardware section coupled with a processor and a graphics engine.

Each independent lane 38 includes an I/O section 40; and, a processor section 42. Furthermore, each independent processing channel comprises an operative graphics section 44. At least one of the independent lanes provides a critical display function that provides commands to the graphics section 44 to drive a display signal to displays of the avionics system, as will be explained below in more detail. At least one other of the independent lanes provides an integrity monitor function as will also be explained below in more detail. A common DPC reset mechanism 46 receives a reset signal from the integrity application of the IML processor section as will also be explained below in more detail.

The I/O section 40 may be, for example, conventional hardware that converts the aircraft interfaces to digital representations that a processor can utilize. The processor section 42 may be, for example, a general avionics processor such as Freescale Power PC 7448. The graphics section 44 may be, for example, a complex ASIC to perform the conversion of display directives from the processor to pixels for an avionics display.

Figure 4:
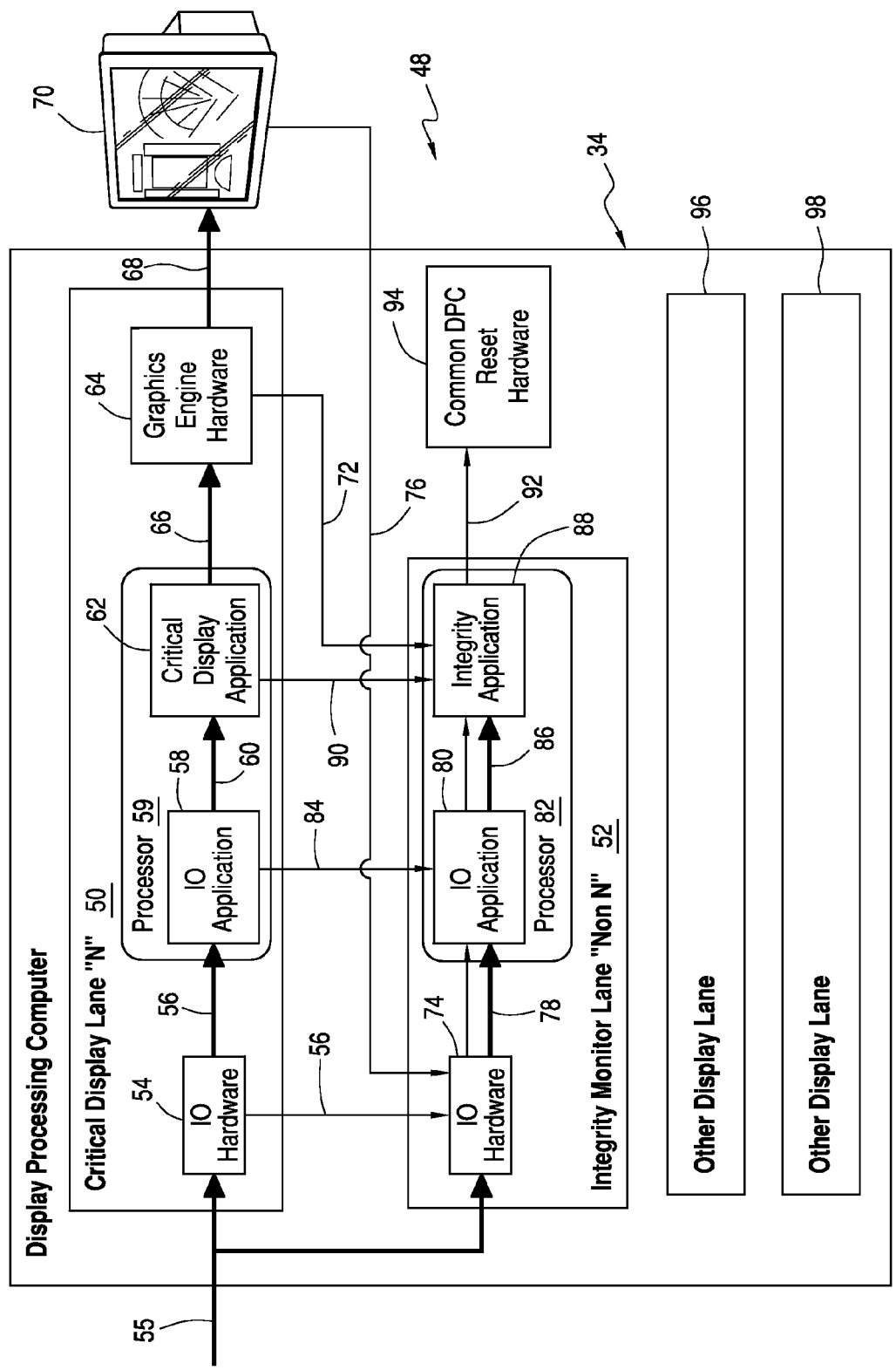
FIG. 4 illustrates the integrity monitoring process of a DPC showing the cooperation of the independent lanes of the DPC to provide high integrity.

Referring now to FIG. 4, the integrity monitoring process of a DPC is illustrated, designated generally as 48. The DPC 34 includes at least two independent lanes including a critical display lane (CDL) 50 and an integrity monitor lane (IML) 52.

A CDL I/O section 54 receives critical data input 55 from an avionics system of the aircraft. The CDL I/O section 54 processes the critical data input and provides CDL I/O section output 56. (Note that in this figure the relatively thin lines represent integrity related data.) An I/O application 58 of the CDL processor section 59 receives the CDL I/O section output 56 and validates the critical data to provide validated critical data 60 from the I/O application 58 of the CDL processor section 42.

A critical display application 62 of the CDL processor section 59 receives the validated critical data from the I/O application 58 of the CDL processor section 59 and processes the graphical representation of the critical data, thus providing processed output.

A CDL graphics engine 64 receives the processed output 66 from the critical display application 62 of the CDL processor section 59 and provides a rendering signal 68 to a display 70 of the avionics display system and an integrity monitor signal 72.

An IML I/O section 74 receives the critical data input 55 from the avionics system of the aircraft, the CDL I/O section output 56, and a feedback signal 76 from the display of the avionics display system. The IML I/O section 74 processes the critical data input, the CDL I/O section output, and the feedback signal from the display and provides IML I/O section output 78.

An I/O application 80 of the IML processor section 82 receives the IML I/O section output 78 and an integrity output 84 from the I/O application 58 of the CDL processor section 59 and processes the same to provide validated integrity data 86 from the I/O application 80 of the IML processor section 82.

An integrity application 88 of the IML processor section 82 receives the validated integrity data 86 from the I/O application 80 of the IML processor section 82, integrity output 90 from the critical display application 62 of the CDL processor section 59, and the integrity monitoring output rendering signal 72 from the CDL graphics engine 74 and provides a reset signal 92.

A common DPC reset mechanism 94 receives the reset signal 92 from the integrity application 88 of the IML processor section 82. The cooperation of the independent CDL and IML lanes provides an integrity display processing capability that assures critical data integrity.

The display integrity feedback interfaces from the displays of the avionics display system provide integrity by allowing the integrity monitor functions to detect faults within the display signals and/or originating from the displays.

The CDL and the IML lanes are preferably configured to simultaneously perform a critical display function for itself and an integrity monitoring function for another lane. Additional lanes can be configured as indicated by numeral designations 96, 98.

Figure 5:
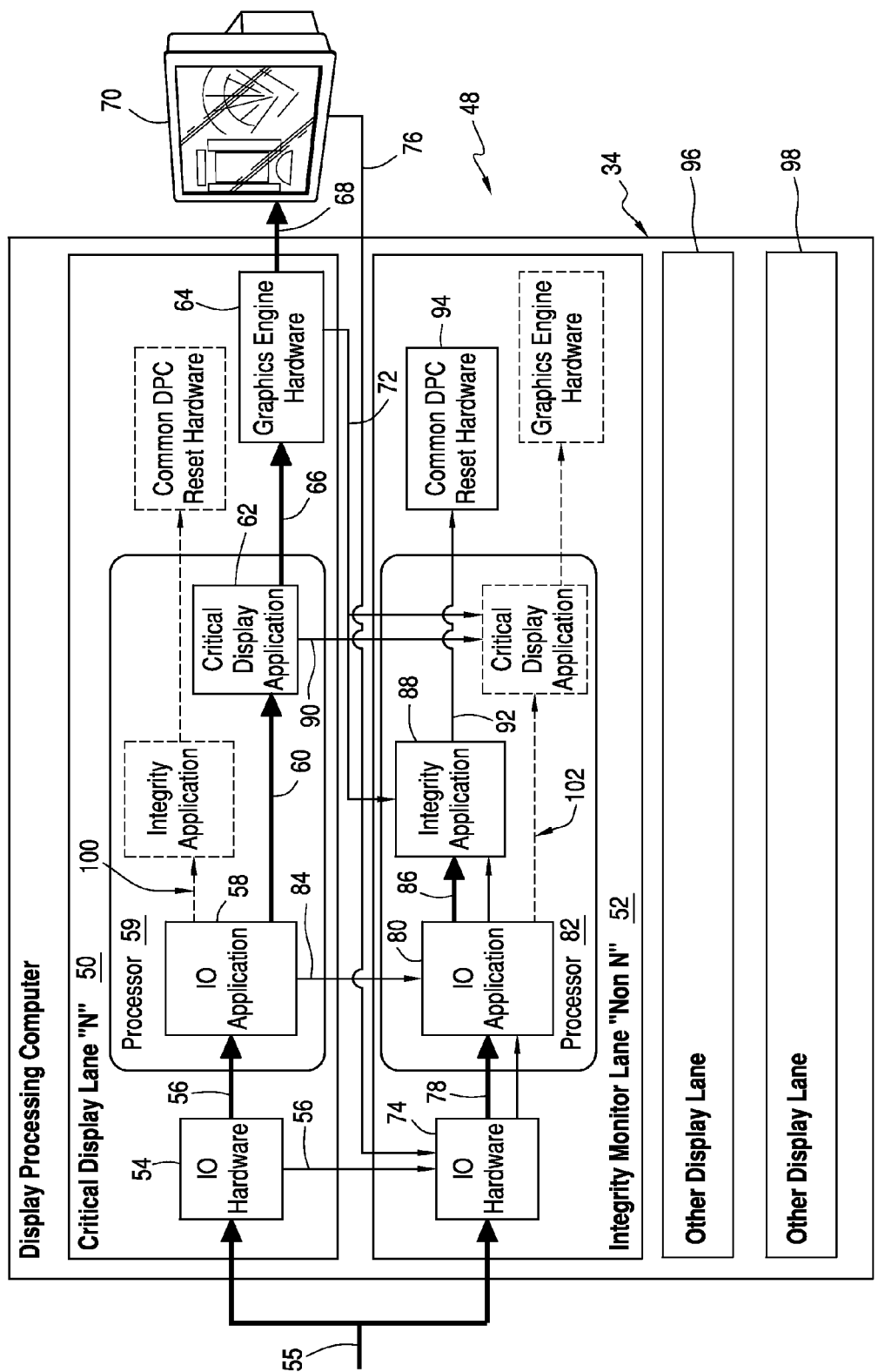
FIG. 5 illustrates the integrity monitoring process of a DPC particularly showing how the critical display lanes (CDL) and the integrity monitor lanes (IML) are configured to reverse their respective functions.

Referring now to FIG. 5, as noted in the phantom lines 100 and 102, the CDL and the IML lanes can be configured to reverse their respective functions.

It should be noted that while the various elements described in this patent application are depicted as discrete distributed components, it will be recognized by one skilled in the art that such functionality (e.g. lanes, channels, etc.) may be implemented in any number of forms including but not limited to software, hardware, firmware, application specific integrated circuitry (ASICs) and the like and may be configured as part of distributed or integrated systems without departing from the scope of the present disclosures.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described is merely an explanatory embodiment thereof. It is the intention of the following claims to encompass and include such changes.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and/or firmware.

Other embodiments and configurations may be devised without departing from the spirit of the invention and the scope of the appended claims.

The invention claimed is:

1. A high integrity, high availability avionics display architecture for an avionics display system, comprising:
   a) a plurality of display processing computers (DPC), each DPC comprising:
      at least two independent processing channels, each independent processing channel comprising at least two independent lanes, each independent lane comprising:
         1. an I/O section; and,
         2. a processor section;
      wherein each independent processing channel comprises an operative graphics section, wherein at least one of said independent lanes provides a critical display function that provides commands to said graphics section to drive a display signal to displays of said avionics system; and, at least one other of said independent lanes provides an integrity monitor function; and,
   b) a plurality of display integrity feedback interfaces from the displays of said avionics display system, said feedback interfaces providing integrity by allowing the integrity monitor functions to detect faults within the display signals and/or originating from the displays.

2. The display architecture of claim 1, wherein each of said at least two independent lanes comprises a critical display lane (CDL) and an integrity monitor lane (IML) and wherein,
   a) a CDL I/O section receives critical data input from an avionics system of an aircraft, wherein said CDL I/O section processes said critical data input and provides CDL I/O section output;
   b) an I/O application of the CDL processor section receives the CDL I/O section output and validates the critical data to provide validated critical data from the I/O application of the CDL processor section;
   c) a critical display application of the CDL processor section receives the validated critical data from the I/O application of the CDL processor section and processes the graphical representation of the critical data, thus providing processed output;
   d) a CDL graphics engine receives the processed output from the critical display application of the CDL processor section and provides a rendering signal to a display of the avionics display system and an integrity monitor signal;
   e) an IML I/O section receives the critical data input from the avionics system of an aircraft, the CDL I/O section output, and a feedback signal from the display of the avionics display system, wherein said IML I/O section processes said critical data input, the CDL I/O section output, and said feedback signal from the display and provides IML I/O section output;
   f) an I/O application of the IML processor section receives the IML I/O section output and an integrity output from the I/O application of the CDL processor section and processes the same to provide validated integrity data from the I/O application of the IML processor section;
   g) an integrity application of the IML processor section receives the validated integrity data from the I/O application of the IML processor section, integrity output from the critical display application of the CDL processor section, and the integrity monitoring output rendering signal from the CDL graphics engine and provides a reset signal; and,
   h) a common DPC reset mechanism for receiving said reset signal from the integrity application of the IML processor section,
   wherein the cooperation of the independent CDL and IML lanes provides an integrity display processing capability that assures critical data integrity.

3. The display architecture of claim 1, wherein said CDL and said IML lanes are configured to reverse their respective functions.

4. The display architecture of claim 1, wherein said CDL and said IML lanes are each configured to simultaneously perform a critical display function for itself and an integrity monitoring function for another lane.

5. The display architecture of claim 1, wherein said plurality of DPC comprises a right DPC and a left DPC, said avionics display architecture further comprising:
   a) a left Integrated Module Architecture (IMA) processing cabinet;
   b) a right Integrated Module Architecture (IMA) processing cabinet;
   c) a plurality of remote data concentrators (RDCs); and,
   d) a common network bus operatively connected to said right DPC, said left DPC, said right IMA processing cabinet, said left IMA processing cabinet, and said RDCs.

6. The display architecture of claim 1, further comprising a plurality of displays.

7. The display architecture of claim 1, further comprising a plurality of displays including heads down displays (HDD) and heads up displays (HUD).

8. The display architecture of claim 1, further comprising a plurality of displays comprising seven displays.

9. The display architecture of claim 1, wherein each of said DPC comprises four independent processing channels.

10. A high integrity, high availability avionics display system, comprising:
    a) an avionics display architecture, comprising:
       i) a plurality of display processing computers (DPC), each DPC comprising:
          at least two independent processing channels, each independent processing channel comprising at least two independent lanes, each independent lane comprising:
             an I/O section; and,
             a processor section;

wherein each independent processing channel comprises an operative graphics section, wherein at least one of said independent lanes provides a critical display function that provides commands to said graphics section to drive a display signal to displays of said avionics system; and, at least one other of said independent lanes provides an integrity monitor function; and, ii) a plurality of display integrity feedback interfaces from the displays of said avionics display system, said feedback interfaces providing integrity by allowing the integrity monitor functions to detect faults within the display signals and/or originating from the displays; and, b) a plurality of displays configured to receive said drive signals and to provide feedback signals for said feedback interfaces.

11. The avionics display system of claim 10, wherein each of said at least two independent lanes comprises a critical display lane (CDL) and an integrity monitor lane (IML) and wherein, a) a CDL I/O section receives critical data input from an avionics system of an aircraft, wherein said CDL I/O section processes said critical data input and provides CDL I/O section output;

b) an I/O application of the CDL processor section receives the CDL I/O section output and validates the critical data to provide validated critical data from the I/O application of the CDL processor section;

c) a critical display application of the CDL processor section receives the validated critical data from the I/O application of the CDL processor section and processes the graphical representation of the critical data providing processed output;

d) a CDL graphics engine receives the processed output from the critical display application of the CDL processor section and provides a rendering signal to a display of the avionics display system and an integrity monitor signal;

e) an IML I/O section receives the critical data input from the avionics system of an aircraft, the CDL I/O section output, and a feedback signal from the display of the avionics display system, wherein said IML I/O section processes said critical data input, the CDL I/O section output, and said feedback signal from the display and provides IML I/O section output;

f) an I/O application of the IML processor section receives the IML I/O section output and an integrity output from the I/O application of the CDL processor section and processes the same to provide validated integrity data from the I/O application of the IML processor section;

g) an integrity application of the IML processor section receives the validated integrity data from the I/O application of the IML processor section, integrity output from the critical display application of the CDL processor section, and the integrity monitoring output rendering signal from the CDL graphics engine and provides a reset signal; and, h) a common DPC reset mechanism for receiving said reset signal from the integrity application of the IML processor section, wherein the cooperation of the independent CDL and IML lanes provides an integrity display processing capability that assures critical data integrity.

12. The avionics display system of claim 10, wherein said CDL and said IML lanes are configured to reverse their respective functions.

13. The avionics display system of claim 10, wherein said CDL and said IML lanes are each configured to simultaneously perform a critical display function for itself and an integrity monitoring function for another lane.

14. The avionics display system of claim 10, wherein said plurality of DPC comprises a right DPC and a left DPC, said avionics display architecture further comprising:
a) a left Integrated Module Architecture (IMA) processing cabinet;
b) a right Integrated Module Architecture (IMA) processing cabinet;
c) a plurality of remote data concentrators (RDCs); and,
d) a common network bus operatively connected to said right DPC, said left DPC, said right IMA processing cabinet, said left IMA processing cabinet, and said RDCs.

15. A method for providing a high integrity, high availability processing capability for an avionics display system, comprising the steps of:
a) utilizing a plurality of display processing computers (DPC), each DPC comprising at least two independent processing channels, each independent processing channel comprising at least two independent lanes, each independent lane comprising an I/O section; and, a processor section, each independent processing channel comprises an operative graphics section, wherein at least one of said independent lanes provides a critical display function that provides commands to said graphics section to drive a display signal to displays of said avionics system; and, at least one other of said independent lanes provides an integrity monitor function; and,
b) providing a plurality of display integrity feedback interfaces from the displays of said avionics display system, said feedback interfaces providing integrity by allowing the integrity monitor functions to detect faults within the display signals and/or originating from the displays.

16. The method of claim 15, wherein each of said at least two independent lanes comprises a critical display lane (CDL) and an integrity monitor lane (IML), wherein said steps of utilizing a plurality of DPC and providing a plurality of display integrity feedback interfaces comprises the steps of:
a) receiving critical data input from an avionics system of an aircraft, using a CDL I/O section, wherein said CDL I/O section processes said critical data input and provides CDL I/O section output;
b) receiving the CDL I/O section output using an I/O application of the CDL processor section and validating the critical data to provide validated critical data from the I/O application of the CDL processor section;
c) receiving the validated critical data from the I/O application using a critical display application of the CDL processor section and processing the graphical representation of the critical data thus providing processed output;
d) receiving the processed output from the critical display application of the CDL processor section using a CDL graphics engine and providing a rendering signal to a display of the avionics display system and an integrity monitor signal;
e) receiving the critical data input from the avionics system of an aircraft using an IML I/O section, the CDL I/O section output, and a feedback signal from the display of the avionics display system; wherein said IML I/O section processes said critical data input, the CDL I/O section output, and said feedback signal from the display and provides IML I/O section output;

f) receiving the IML I/O section output and an integrity output from the I/O application of the CDL processor section using an I/O application of the IML processor section and processing the same to provide validated integrity data from the I/O application of the IML processor section;

g) receiving the validated integrity data from the I/O application of the IML processor section, integrity output from the critical display application of the CDL processor section, and the integrity monitoring output rendering signal from the CDL graphics engine using an integrity application of the IML processor section and providing a reset signal; and, h) receiving said reset signal from the integrity application of the IML processor section using a common DPC reset mechanism, wherein the cooperation of the independent CDL and IML lanes provides an integrity display processing capability that assures critical data integrity.

17. The method of claim 16, wherein said CDL and said IML lanes are configured to reverse their respective functions.

18. The method of claim 16, wherein said CDL and said IML lanes are each configured to simultaneously perform a critical display function for itself and an integrity monitoring function for another lane.

* * * * *